United States Patent
Bormuth et al.

(10) Patent No.: US 7,726,000 B2
(45) Date of Patent: Jun. 1, 2010

(54) METHOD OF SECURING FIRST AND SECOND SPLINED MEMBERS TOGETHER

(75) Inventors: Phillip J. Bormuth, McComb, OH (US);
David A. Brock, Toledo, OH (US);
Philip A. Eversole, Toledo, OH (US);
Ryan W. Laskey, Toledo, OH (US);
Nelson Wagner, Holland, OH (US)

(73) Assignee: Dana Automotive Systems Group, LLC, Toledo, OH (US)

( * ) Notice: Subject to any disclaimer, the term of this patent is extended or adjusted under 35 U.S.C. 154(b) by 1395 days.

(21) Appl. No.: 11/130,897

(22) Filed: May 17, 2005

(65) Prior Publication Data

US 2006/0260116 A1    Nov. 23, 2006

(51) Int. Cl.
*B21D 39/00*    (2006.01)
(52) U.S. Cl. ........................................ 29/521
(58) Field of Classification Search ........... 29/521, 29/505, 525, 517; 464/162
See application file for complete search history.

(56) References Cited

U.S. PATENT DOCUMENTS

| | | | |
|---|---|---|---|
| 560,790 A * | 5/1896 | Laue | ............ 119/408 |
| 2,930,660 A | 3/1960 | Dunn | |
| 3,670,630 A | 6/1972 | Tyson et al. | |
| 3,857,642 A | 12/1974 | Miller | |
| 4,083,202 A | 4/1978 | Westercamp | |
| 4,224,806 A | 9/1980 | Kobayashi | |
| 4,419,804 A | 12/1983 | Axthammer | |
| 4,475,737 A | 10/1984 | Cook, Jr. et al. | |
| 5,771,425 A | 6/1998 | Yamada et al. | |
| 6,412,474 B1 | 7/2002 | Guentert et al. | |
| 6,533,362 B1 | 3/2003 | Simmons | |

FOREIGN PATENT DOCUMENTS

| | | |
|---|---|---|
| DE | 3912853 | 11/1989 |
| DE | 4002558 | 8/1990 |
| DE | 4005996 | 8/1991 |
| DE | 19513992 A1 | 10/1996 |
| GB | 1264707 | 2/1972 |

* cited by examiner

*Primary Examiner*—John C Hong
(74) *Attorney, Agent, or Firm*—Marshall & Melhorn LLC

(57) ABSTRACT

A method is provided for securing first and second splined members together, such as a midship tube shaft to an end fitting in a driveshaft assembly, to prevent relative axial movement from occurring therebetween. Initially, a first splined member is provided that includes an outer surface having a recess and a plurality of external splines provided thereon. Also, a second splined member is provided that includes an inner surface a plurality of internal splines provided thereon. The inner surface of the second splined member is disposed about the outer surface of the first splined member such that the plurality of internal splines cooperate with the plurality of external splines. Then, a portion of the second splined member is deformed into the recess of the first splined member to secure the first and second splined members together, while preventing relative axial movement from occurring therebetween.

19 Claims, 5 Drawing Sheets

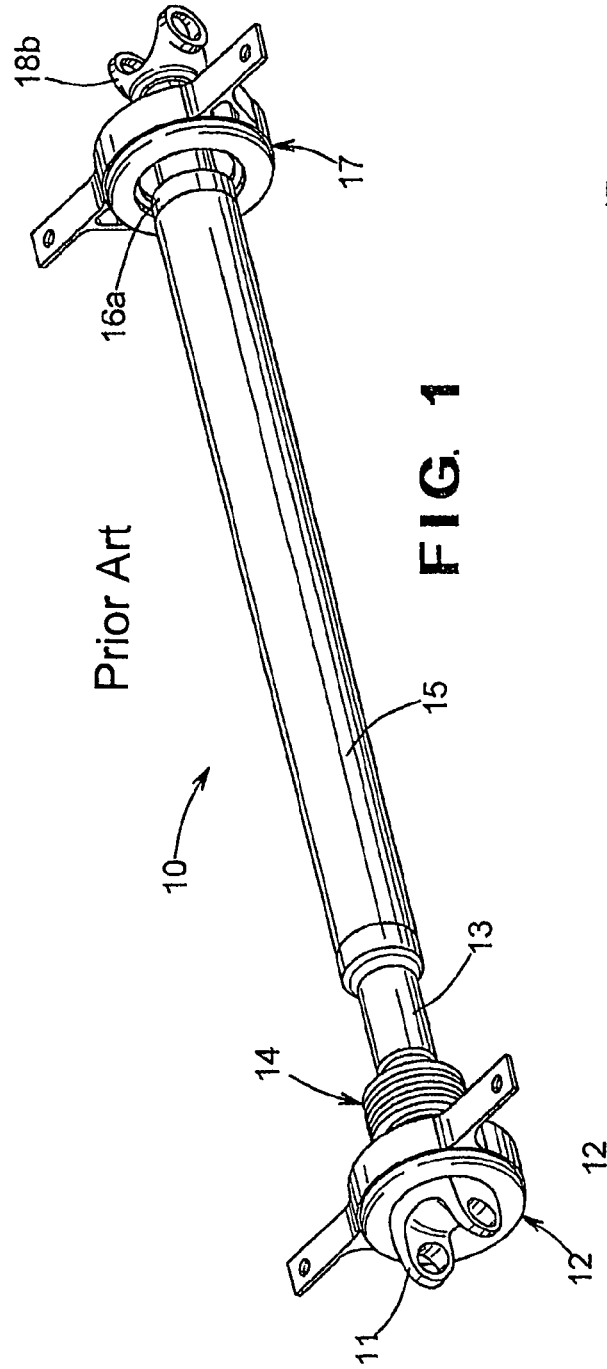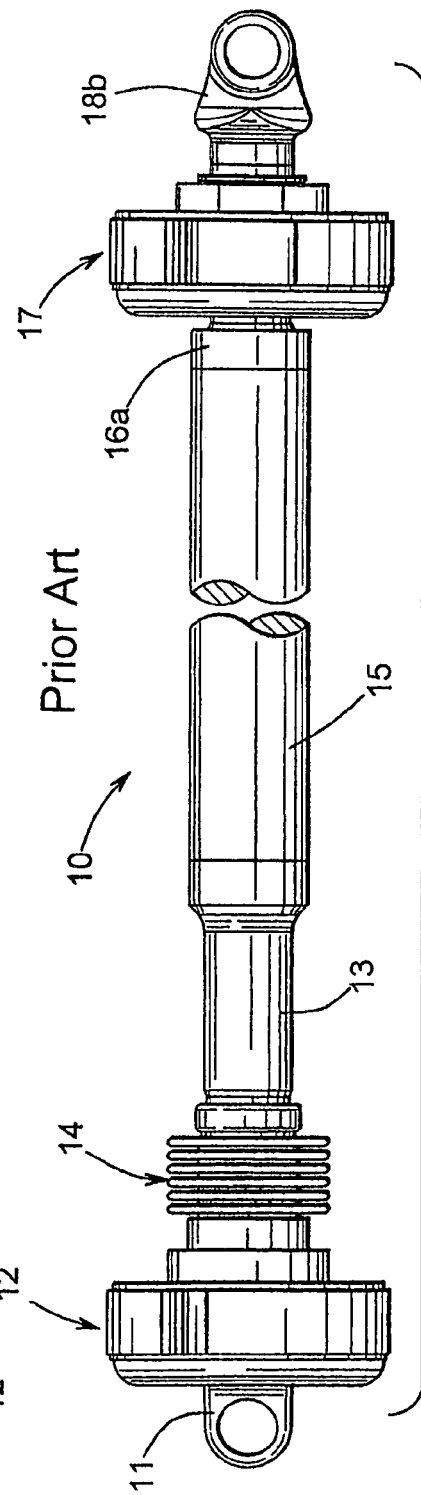

US 7,726,000 B2

METHOD OF SECURING FIRST AND SECOND SPLINED MEMBERS TOGETHER

BACKGROUND OF THE INVENTION

This invention relates in general to a method of securing first and second splined members together, such as is done when manufacturing a driveshaft assembly for use in a drive train system. In particular, this invention relates to an improved method of securing an end fitting to a midship tube shaft in such a driveshaft assembly to prevent relative axial movement from occurring therebetween.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a typical driveshaft assembly includes a hollow cylindrical driveshaft tube having a pair of end fittings, such as a pair of tube yokes, secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The front and rear universal joints provide a rotational driving connection from the output shaft of the engine/transmission assembly through the driveshaft tube to the input shaft of the axle assembly, while accommodating a limited amount of angular misalignment between the rotational axes of these three shafts.

In some instances, the driveshaft assembly is formed from a hollow cylindrical driveshaft tube having a midship tube shaft secured thereto. The midship tube shaft includes a first end that is adapted to be secured to an end of the driveshaft tube and a second end portion having an externally splined portion provided thereon. The first end of the midship tube shaft is typically connected to the end of the driveshaft tube by welding. A center bearing assembly can be mounted on a central portion of the midship tube shaft located between the first and second end portions. An end yoke can be connected to the second end portion of the midship tube shaft. The end yoke has an internally splined sleeve portion that cooperates with the externally splined second end portion of the midship tube shaft so as to be fixed for rotation therewith.

In some applications, it is desirable to prevent relative axial movement from occurring between the midship tube shaft and the end yoke, notwithstanding the splined connection therebetween. To accomplish this, it is known to provide an external thread on the tip of the second end portion of the midship tube shaft. The threaded tip of the second end portion of the midship tube shaft extends through an opening formed through the end yoke. Then, a nut is threaded onto the threaded tip of the second end portion of the midship tube shaft to retain the end yoke thereon and to prevent relative axial movement from occurring therebetween. Although this structure has been effective, it has been found to be somewhat complicated, expensive, and space consuming. Alternatively, it is known to weld the end yoke directly to the second end portion of the midship tube shaft. However, the use of welding can be undesirable for a variety of reasons. Thus, it would be desirable to provide an improved method of securing an end fitting to a midship tube shaft to prevent relative axial movement therebetween in such a driveshaft assembly.

SUMMARY OF THE INVENTION

This invention relates to an improved method of securing first and second splined members together, such as a midship tube shaft to an end fitting in a driveshaft assembly, to prevent relative axial movement from occurring therebetween. Initially, a first splined member is provided that includes an outer surface having a recess and a plurality of external splines provided thereon. Also, a second splined member is provided that includes an inner surface a plurality of internal splines provided thereon. The inner surface of the second splined member is disposed about the outer surface of the first splined member such that the plurality of internal splines cooperate with the plurality of external splines. Then, a portion of the second splined member is deformed into the recess of the first splined member to secure the first and second splined members together, while preventing relative axial movement from occurring therebetween.

Various objects and advantages of this invention will become apparent to those skilled in the art from the following detailed description of the preferred embodiments, when read in light of the accompanying drawings.

BRIEF DESCRIPTION OF THE DRAWINGS

FIG. 1 is a perspective view of a driveshaft assembly including a midship tube shaft and an end fitting that have been secured together in accordance with the method of this invention.

FIG. 2 is a side elevational view of the driveshaft assembly illustrated in FIG. 1.

DETAILED DESCRIPTION OF THE PREFERRED EMBODIMENTS

Figure 3:
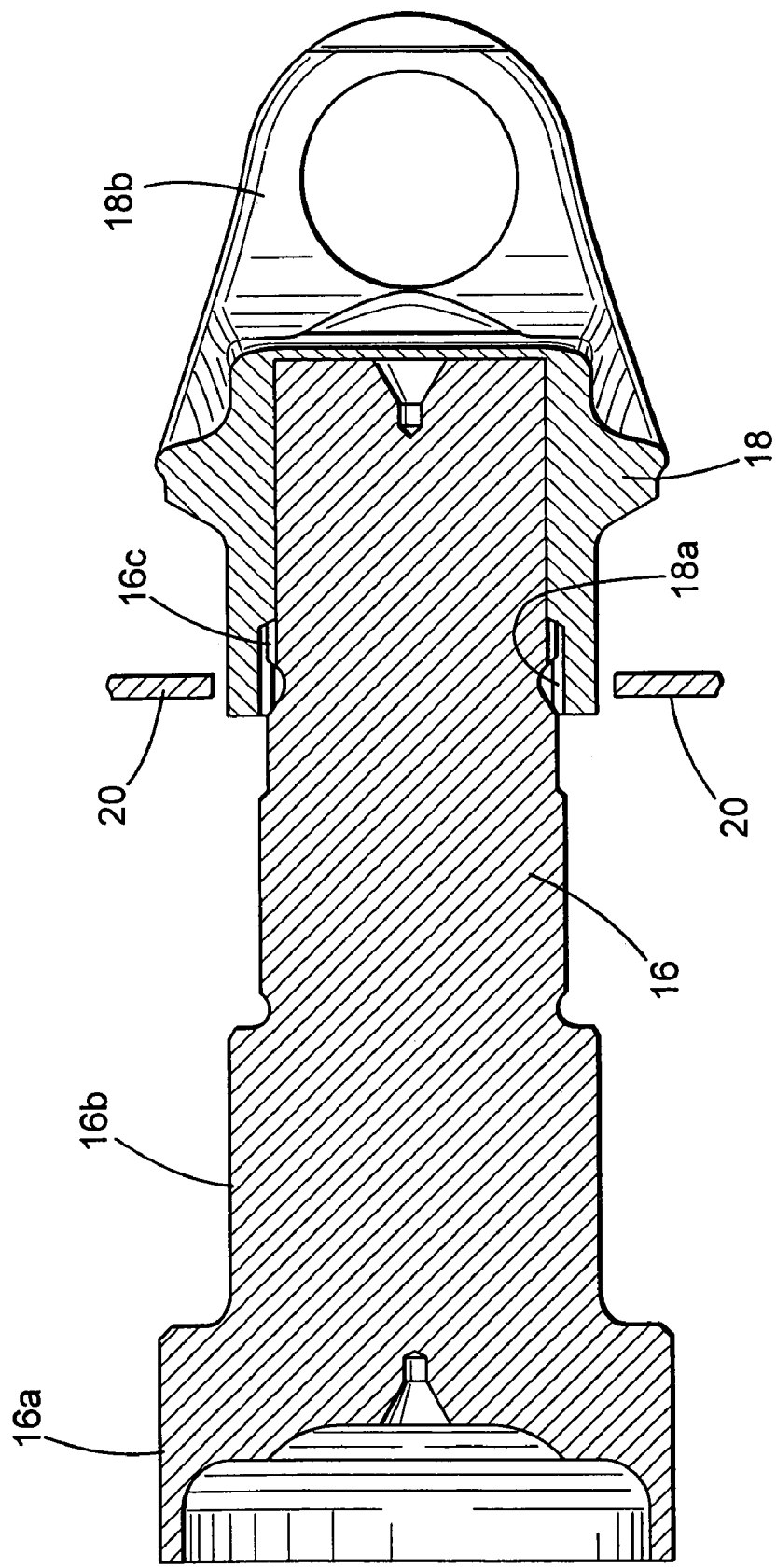
FIG. 3 is an enlarged sectional elevational view of portions of the midship tube shaft and the end yoke of the driveshaft assembly illustrated in FIGS. 1 and 2 shown assembled, but prior to being secured together in accordance with a first embodiment of the method of this invention.

Referring now to the drawings, there is illustrated in FIG. 1 a driveshaft assembly, indicated generally at 10, that can, for example, be used in a conventional drive train system (not shown) for transmitting rotational power from a source of rotational power, such as an internal combustion or diesel engine, to a driven device, such as a plurality of driven wheels. The illustrated driveshaft assembly 10 is, for the most part, conventional in the art and is intended merely to illustrate one environment in which this invention may be used. Thus, the scope of this invention is not intended to be limited for use with the specific structure for the driveshaft assembly 10 illustrated in FIG. 1 or to driveshaft assemblies in general. On the contrary, as will become apparent below, this invention may be used in any desired environment for the purposes described below.

The illustrated driveshaft assembly 10 includes a yoke shaft 11 or other end fitting that is adapted to connect one end of the driveshaft assembly 10 to a first external device (not shown), such as a source of rotational power. The illustrated yoke shaft 11 is conventional in the art and includes a body portion (not shown) that is supported for rotation by a first center bearing assembly, indicated generally at 12. The structure and operation of the first center bearing assembly 12 is conventional in the art and forms no part of this invention. The yoke shaft 11 includes a pair of spaced apart yoke arms that extend generally axially from the body portion thereof. The yoke arms are provided to facilitate the connection of the yoke shaft 1 (and, therefore, the driveshaft assembly 10) to the first external device. The yoke shaft 11 also includes an externally splined end portion (not shown) that extends in a second axial direction from the body portion thereof. The externally splined portion of the yoke shaft 11 is received within an internally splined portion of a tubular sleeve 13 for concurrent rotational movement and for limited relative axial movement. A conventional flexible boot assembly, indicated generally at 14, extends between the yoke shaft 11 and the tubular sleeve 13 to prevent dirt, water, and other contaminants from entering into the region of the cooperating external and internal splined portions.

The tubular sleeve 13 is welded or otherwise secured to a first end of a driveshaft tube 15 that extends throughout most of the length of the driveshaft assembly 10. A second end of the driveshaft tube 15 is welded or otherwise secured to a midship tube shaft 16. The structure of the midship tube shaft 16 is illustrated in detail in FIGS. 3 and 4. As shown therein, the midship tube shaft 16 includes an outer surface having a first end 16a that is adapted to be secured to the second end of the driveshaft tube 15. The first end 16a of the midship tube shaft 16 can be secured to the second end of the driveshaft tube 15 in any conventional manner, such as by welding or adhesives, for example. The midship tube shaft 16 also includes a central portion 16b having a cylindrical outer surface. A second center bearing assembly, indicated generally at 17, engages the cylindrical outer surface of the central portion 16b of the midship tube shaft 16 and supports same for rotation. The structure and operation of the second center bearing assembly 17 is also conventional in the art and forms no part of this invention. In a manner that is well known in the art, the first and second center bearing assemblies 12 and 17 are adapted to be respectively secured to one or more support surfaces so as to support the driveshaft assembly 10 for rotation relative thereto. The outer surface of the midship tube shaft 16 further includes a second end 16c having a plurality of external splines provided thereon.

Lastly, the driveshaft assembly 10 includes an end yoke 18 having an internally splined sleeve portion 18a provided on an inner surface thereof and a pair of spaced apart yoke arms 18b that extend generally axially therefrom. The internally splined sleeve portion 18a of the end yoke 18 receives and cooperates with the plurality of external splines provided on the second end 16c of the midship tube shaft 16 for concurrent rotational movement therebetween. The yoke arms 18b of the end yoke 18 are provided to facilitate the connection of the yoke shaft 11 (and, therefore, the driveshaft assembly 10) to a second external device (not shown), such as an axle assembly for driving a plurality of driven wheels.

As mentioned above, it is sometimes desirable to prevent relative axial movement from occurring between the midship tube shaft 16 and the end yoke 18, notwithstanding the splined connection therebetween. FIGS. 3 through 6 illustrate the method of this invention in detail for accomplishing this. As shown therein, the outer surface of the midship tube shaft 16 is provided with a recess 16d (shown in FIGS. 5 and 6). The illustrated recess 16d is annular in shape, extending completely about the circumference of the midship tube shaft 16. However, the recess 16d may extend only about a portion of the circumference of the midship tube shaft 16 if desired. Additionally, the recess 16d may be embodied as a plurality of discrete recesses that, as a group, extend about the circumference of the midship tube shaft 16. In the illustrated embodiment, the recess 16d is generally trapezoidal in cross sectional shape, including a pair of angled, linear side walls and a linear bottom wall. However, the recess 16d may be formed having any desired cross sectional shape or shapes. The illustrated recess 16d is located adjacent to the plurality of splines provided on the second end portion 16c of the midship tube shaft 16. However, the recess 16d may be provided at any desired location on the second end portion 16c of the midship tube shaft 16. The recess 16d may be formed in the midship tube shaft 16 by any desired process, such as by machining, for example.

Figure 5:
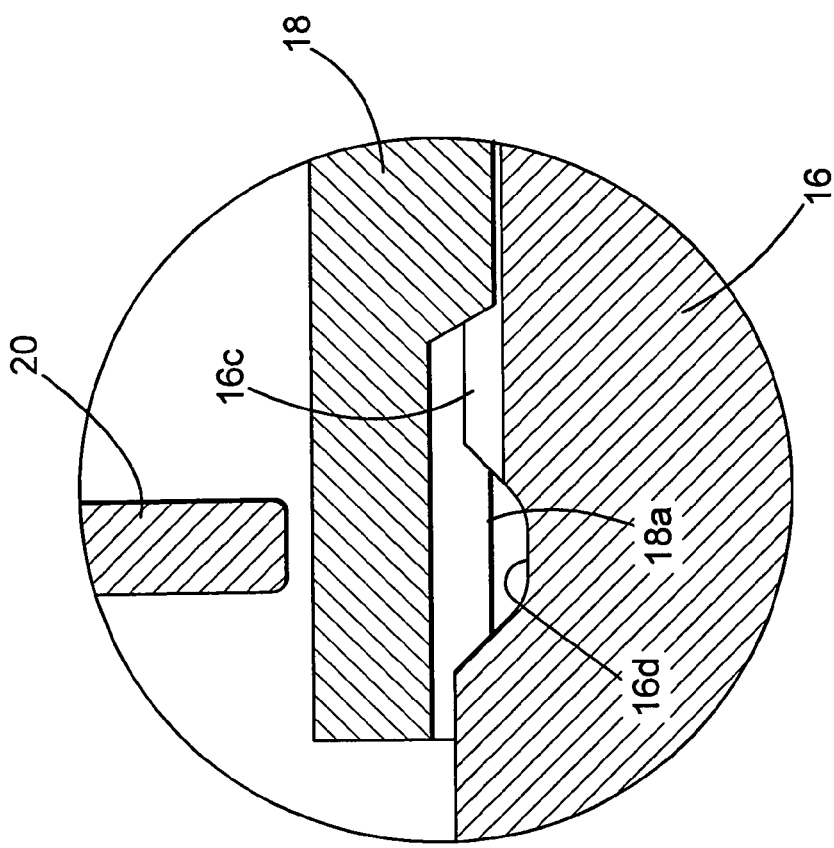
FIG. 5 is a further enlarged sectional elevational view of portions of the midship tube shaft and the end yoke of the driveshaft assembly illustrated in FIG. 3 shown assembled, but prior to being secured together in accordance with the first embodiment of the method of this invention.

As best shown in FIG. 5, the end yoke 18 is initially assembled onto the midship tube shaft 16 such that the internally splined sleeve portion 18a of the end yoke 18 receives the plurality of external splines provided on the second end 16c of the midship tube shaft 16. Thus, as discussed above, the internally splined sleeve portion 18a of the end yoke 18 cooperates with the plurality of external splines provided on the second end 16c of the midship tube shaft 16 for concurrent rotational movement therebetween. In this initial position, the internally splined sleeve portion 18a of the end yoke 18 extends axially over at least a portion of the recess 16d provided in the midship tube shaft 16.

Figure 6:
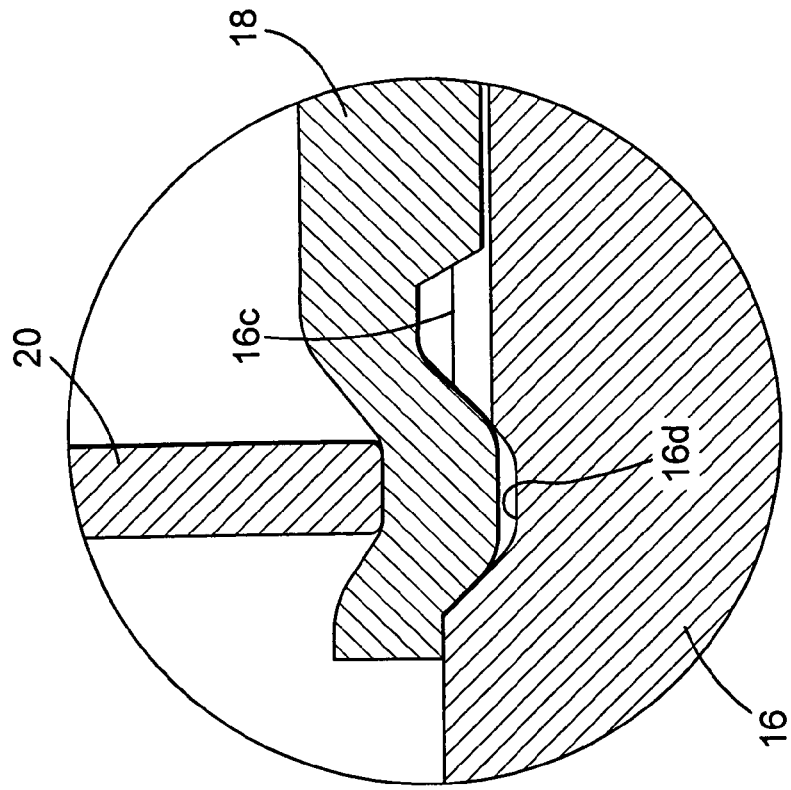
FIG. 6 is a further enlarged sectional elevational view of portions of the midship tube shaft and the end yoke of the driveshaft assembly illustrated in FIG. 4 shown as they are being secured together in accordance with a first embodiment of the method of this invention.

Then, as shown in FIG. 6, a deforming tool, such as a staking tool 20, is moved into engagement with a portion of the internally splined sleeve portion 18a of the end yoke 18. The staking tool 20 deforms the engaged portion of the internally splined sleeve portion 18a of the end yoke 18, causing it to move inwardly into the recess 16d. As a result, the deformed portion of the internally splined sleeve portion 18a of the end yoke 18 engages the side walls of the recess 16d provided in the midship tube shaft 16. Consequently, the midship tube shaft 16 and the end yoke 18 are secured together to prevent relative axial movement from occurring therebetween.

Figure 4:
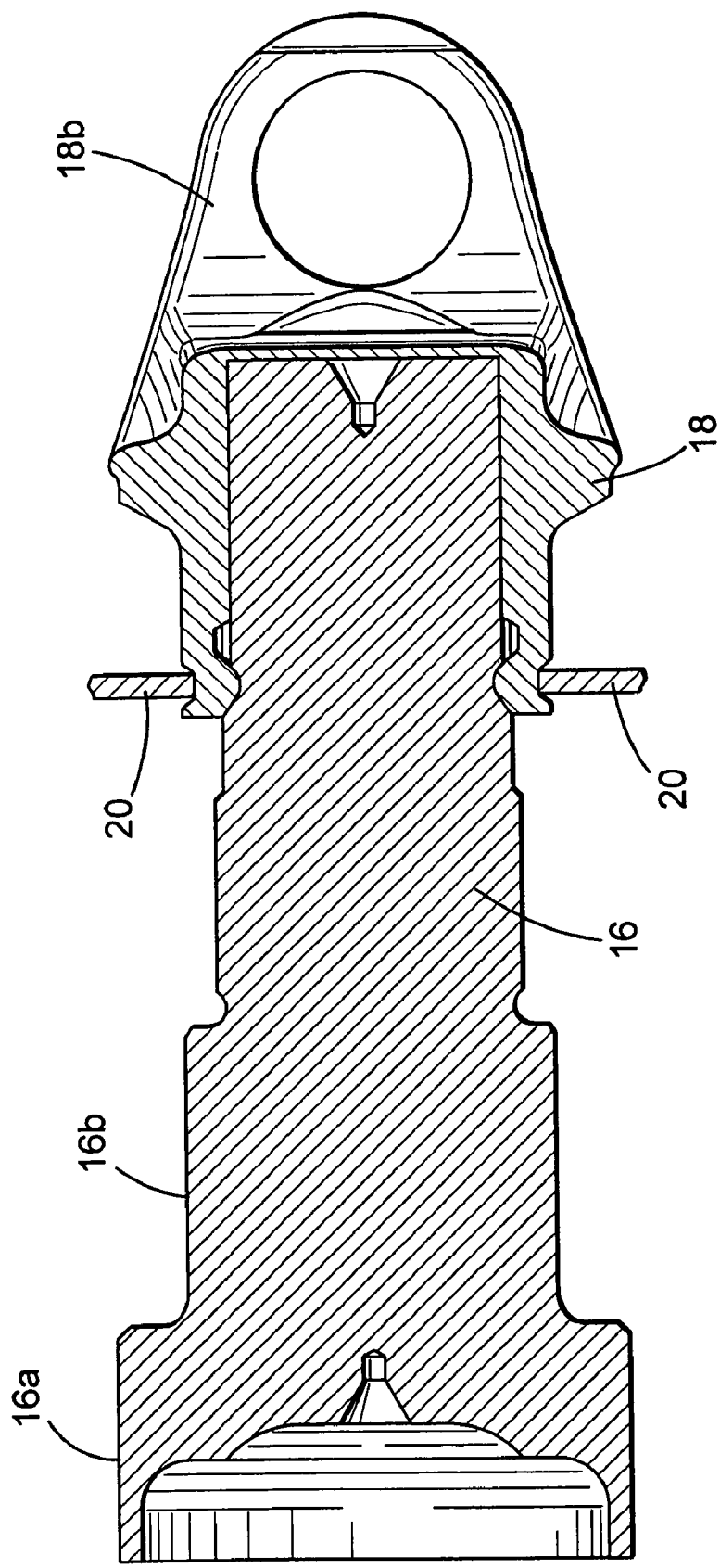
FIG. 4 is an enlarged sectional elevational view similar to FIG. 3 showing the midship tube shaft and the end yoke of the driveshaft assembly shown as they are being secured together in accordance with the first embodiment of the method of this invention.

Preferably, as shown in FIGS. 3 and 4, a pair of staking tools 20 are used to simultaneously deform circumferentially opposed portions of the internally splined sleeve portion 18a of the end yoke 18 and deforms it inwardly into the recess 16d provided in the midship tube shaft 16. The forces that are exerted on the assembly of the midship tube shaft 16 and the end yoke 18 during such simultaneous and circumferentially opposed staking are preferably equal and opposite to one another. As a result, no significant lateral forces are exerted on the assembly of the midship tube shaft 16 and the end yoke 18 during the securement process. However, it will be appreciated that the deformation process can be performed by a greater or less number of staking tools 20.

Figure 7:
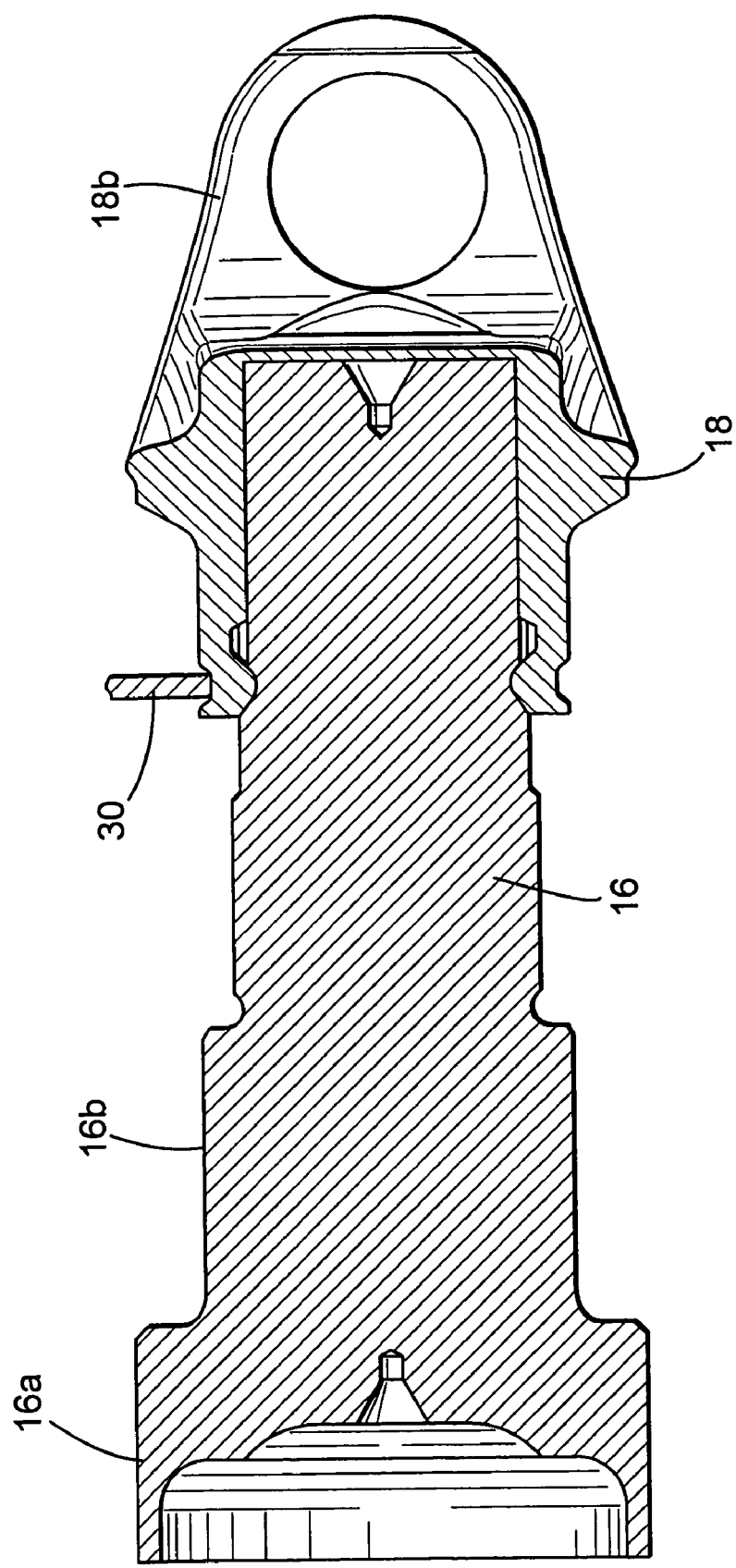
FIG. 7 is an enlarged sectional elevational view similar to FIG. 4 showing the midship tube shaft and the end yoke of the driveshaft assembly shown as they are being secured together in accordance with a second embodiment of the method of this invention.

Alternatively, as shown in FIG. 7, a single staking tool 30 may be provided to deform the portion of the internally splined sleeve portion 18a of the end yoke 18 into the recess 16d provided in the midship tube shaft 16. In this alternative embodiment of the method of this invention, the single staking tool 30 can be a rolling tool that is moved into engagement with the assembly of the end yoke 18 and the midship tube shaft 16 as it is rotated relative thereto about its longitudinal axis. Thus, as the assembly of the end yoke 18 and the midship tube shaft 16 is rotated relative to the single staking tool 30, the internally splined sleeve portion 18a of the end yoke 18 is circumferentially deformed into the recess 16d provided in the midship tube shaft 16. In a further alternative embodiment of the method of this invention, the single staking tool 30 can be reciprocated inwardly and outwardly into and out of engagement with the assembly of the end yoke 18 and the midship tube shaft 16 as it is rotated relative thereto about its longitudinal axis. Thus, the single staking tool 30 can be used in a sequential manner to deform multiple circumferential portions of the internally splined sleeve portion 18a of the end yoke 18 into the recess 16d provided in the midship tube shaft 16.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of securing first and second splined members together comprising the steps of:
   (a) providing a first splined member including an outer surface having a recess and a plurality of external splines provided thereon;
   (b) providing a second splined member including an inner surface having a plurality of internal splines provided thereon;
   (c) disposing the inner surface of the second splined member about the outer surface of the first splined member such that the plurality of internal splines cooperate with the plurality of external splines; and
   (d) deforming a portion of the splines of the second splined member into the recess of the first splined member to secure the first and second splined members together.

2. The method defined in claim 1 wherein said step (a) is performed by providing an annular recess that extends completely about the circumference of the first splined member.

3. The method defined in claim 1 wherein said step (a) is performed by providing a recess that is generally trapezoidal in cross sectional shape, including a pair of angled, linear side walls and a linear bottom wall.

4. The method defined in claim 1 wherein said step (a) is performed by providing a recess that is located adjacent to the plurality of external splines.

5. The method defined in claim 1 wherein said step (d) is performed by staking.

6. The method defined in claim 5 wherein said step (d) is performed by providing a staking tool and moving the staking tool into engagement with a portion of the first splined member.

7. The method defined in claim 5 wherein said step (d) is performed by providing a rolling staking tool and moving the rolling staking tool into engagement with a portion of the first splined member while the assembly of the first and second splined members is rotated relative thereto.

8. The method defined in claim 5 wherein said step (d) is performed by providing a pair of staking tools and moving the pair of staking tools into engagement with opposed portions of the first splined member.

9. The method defined in claim 5 wherein said step (d) is performed by providing a pair of staking tools and moving the pair of staking tools simultaneously into engagement with opposed portions of the first splined member.

10. The method defined in claim 1 wherein said step (a) is performed by providing a midship tube shaft of a driveshaft assembly as the first splined member and wherein said step (b) is performed by providing an end yoke of a driveshaft assembly as the second splined member.

11. A method of securing a midship tube shaft to an end fitting comprising the steps of:
    (a) providing a midship tube shaft including an outer surface having a recess and a plurality of external splines provided thereon;
    (b) providing an end fitting including an inner surface having a plurality of internal splines provided thereon;
    (c) disposing the inner surface of the end fitting about the outer surface of the midship tube shaft such that the plurality of internal splines cooperate with the plurality of external splines; and
    (d) deforming a portion of the splines of the end fitting into the recess of the midship tube shaft to secure the midship tube shaft to the end fitting.

12. The method defined in claim 11 wherein said step (a) is performed by providing an annular recess that extends completely about the circumference of the midship tube shaft.

13. The method defined in claim 11 wherein said step (a) is performed by providing a recess that is generally trapezoidal in cross sectional shape, including a pair of angled, linear side walls and a linear bottom wall.

14. The method defined in claim 11 wherein said step (a) is performed by providing a recess that is located adjacent to the plurality of external splines.

15. The method defined in claim 11 wherein said step (d) is performed by staking.

16. The method defined in claim 15 wherein said step (d) is performed by providing a staking tool and moving the staking tool into engagement with a portion of the midship tube shaft.

17. The method defined in claim 15 wherein said step (d) is performed by providing a rolling staking tool and moving the rolling staking tool into engagement with a portion of the midship tube shaft while the assembly of the midship tube shaft and the end yoke is rotated relative thereto.

18. The method defined in claim 15 wherein said step (d) is performed by providing a pair of staking tools and moving the pair of staking tools into engagement with opposed portions of the midship tube shaft.

19. The method defined in claim 15 wherein said step (d) is performed by providing a pair of staking tools and moving the pair of staking tools simultaneously into engagement with opposed portions of the midship tube shaft.

* * * * *